United States Patent
Kim et al.

(10) Patent No.: US 10,465,065 B2
(45) Date of Patent: Nov. 5, 2019

(54) COMPOUND COMPOSITION FOR VEHICLE INTERIOR MATERIAL USING NATURAL FIBER

(71) Applicants: Cheol Woo Kim, Gyeonggi-Do (KR); Deuk Ki Joo, Seoul (KR); Ki Woong Lee, Daejeon (KR)

(72) Inventors: Cheol Woo Kim, Gyeonggi-Do (KR); Deuk Ki Joo, Seoul (KR); Ki Woong Lee, Daejeon (KR)

(73) Assignees: HANYANG ADVENCED MATERIALS CO., LTD. (KR); SEOYON E-HWA CO., LTD. (KR)

( * ) Notice: Subject to any disclaimer, the term of this patent is extended or adjusted under 35 U.S.C. 154(b) by 0 days.

(21) Appl. No.: 15/675,021

(22) Filed: Aug. 11, 2017

(65) Prior Publication Data

US 2018/0044512 A1 Feb. 15, 2018

(30) Foreign Application Priority Data

Aug. 11, 2016 (KR) .......................... 10-2016-0102314

(51) Int. Cl.
| | | |
|---|---|---|
| *C08L 23/12* | (2006.01) | |
| *B60R 13/02* | (2006.01) | |
| *C08L 23/10* | (2006.01) | |

(52) U.S. Cl.
CPC .......... *C08L 23/12* (2013.01); *B60R 13/0243* (2013.01); *C08L 23/10* (2013.01); *C08L 2205/025* (2013.01); *C08L 2205/035* (2013.01); *C08L 2205/16* (2013.01)

(58) Field of Classification Search
CPC .......... C08L 23/10; C08L 23/12; C08L 23/14; C08L 2205/025; C08L 2205/03; C08L 2205/035; C08L 2205/16
See application file for complete search history.

(56) References Cited

U.S. PATENT DOCUMENTS

2008/0287597 A1 11/2008 Pham et al.

FOREIGN PATENT DOCUMENTS

| JP | 2010519065 A | | 6/2010 |
|---|---|---|---|
| KR | 10106289000 | | 8/2011 |
| KR | 20160064391 | * | 6/2016 |
| KR | 20160064391 A | | 6/2016 |
| KR | 20160066979 A | | 6/2016 |

OTHER PUBLICATIONS

Office Action corresponding to U.S. Appl. No. 15/675,021 dated Feb. 22, 2018.

* cited by examiner

*Primary Examiner* — Roberto Rabago
(74) *Attorney, Agent, or Firm* — Tarolli, Sundheim, Covell & Tummino LLP

(57) ABSTRACT

Disclosed herein is a compound composition for a vehicle interior material using a natural fiber, which has use for enhancing physical properties, such as shock resistance, tensile strength, flexural strength, elongation, flexural modulus of elasticity, and heat deflection temperature, while realizing a reduction in weight of a vehicle. The compound composition is composed of a base resin obtained by mixing a high-fluidity polypropylene resin and a high-impact polypropylene resin, the base resin being a thermoplastic resin, a reinforcing filler that is a lightweight, eco-friendly, and low-density natural fiber, an impact modifier that is ethylene-propylene-octene rubber, an inorganic filler that functions as a nuclear agent, and a maleic-anhydride compatibilizer.

5 Claims, 1 Drawing Sheet

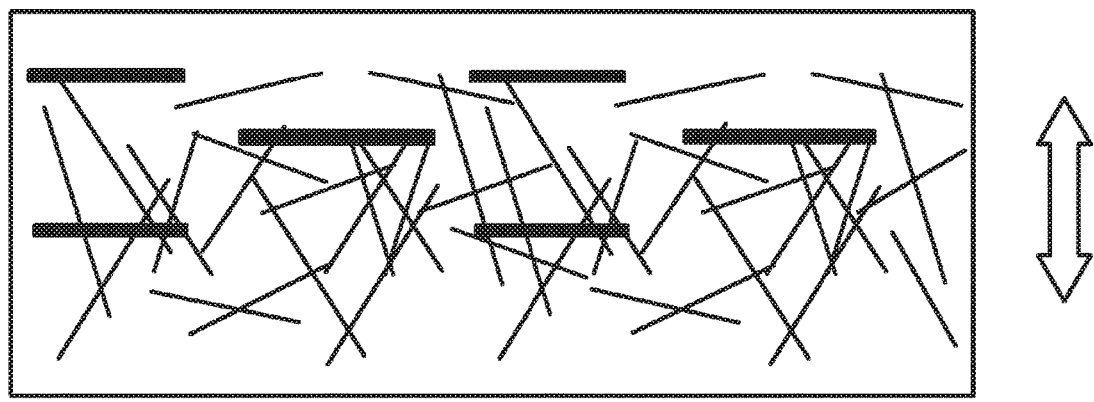

COMPOUND COMPOSITION FOR VEHICLE INTERIOR MATERIAL USING NATURAL FIBER

BACKGROUND OF THE INVENTION

Field of the Invention

Exemplary embodiments of the present invention relate to a compound composition for a vehicle interior material using a natural fiber, which enhances physical properties, such as shock resistance, tensile strength, flexural strength, elongation, flexural modulus of elasticity, and heat deflection temperature, while realizing a reduction in weight of a vehicle, and more particularly, to a compound composition for a vehicle interior material using a natural fiber, which is composed of a base resin obtained by mixing a high-fluidity polypropylene resin and a high-impact polypropylene resin, the base resin being a thermoplastic resin, a reinforcing filler that is a lightweight, eco-friendly, and low-density natural fiber, an impact modifier that is ethylene-propylene-octene rubber, an inorganic filler that functions as a nucleating agent, and a maleic-anhydride compatibilizer.

In particular, exemplary embodiments of the present invention relate to a compound composition for a vehicle interior material using a natural fiber, which improves fuel efficiency of a vehicle through low specific gravity by reinforcing a lightweight and eco-friendly natural fiber, while achieving eco friendliness, enhancing physical properties, such as shock resistance, tensile strength, flexural strength, elongation, flexural modulus of elasticity, and heat deflection temperature of a vehicle interior material including a vehicle part, recycling scrap, improving workability, and reducing costs of manufacture, compared to a conventional vehicle interior material including a vehicle part composed of a thermoplastic resin and an inorganic filler.

Description of the Related Art

In general, PVC, ABS, polyethylene (PE), and polypropylene (PP), which are thermoplastic resins, are mainly used for a vehicle interior material including a vehicle part, and a glass fiber as physical property reinforcement or inorganic substances such as whisker, talc, calcium carbonate, and kaolin are mixed and used according to the vehicle part.

However, these inorganic substances cause environmental pollution in manufacture and parts manufactured using the same are not recycled with ease, which may lead to poor environments, low workability, and increase in cost.

In addition, a method of adding an inorganic substance as a filler to prevent a low modulus of elasticity. However, the application of physical property reinforcement having a high specific gravity of 2.5 to 4.0 as the physical property reinforcement may result in increasing weights of vehicles due to a high percentage of molded parts of vehicles, and the addition of a small amount of physical property reinforcement may not offer a merit. The high-density physical property reinforcement as such an inorganic substance may deteriorate the gloss, shock resistance, tensile strength, flexural strength, elongation, flexural modulus of elasticity, and heat deflection temperature of products in exterior appearance, and may bring about many changes in physical properties.

In addition, since a typical polypropylene resin composition is light and has excellent mechanical properties for the price, it is widely used as the material of an injection molded part. In recent years, the use of product using polypropylene has widened from simple exterior finishing materials or packing materials to fields for ensuring durability in user's service environment.

As product has become larger, there has been an attempt to reduce the thickness of the product to reduce its weight. However, due to the thinness of the product, there is a problem in that the product is easily damaged by exterior shocks and has low shock resistance.

U.S. Patent Application Publication No. 2008-0287579 discloses a technology for increasing impact strength by adding rubber elastomer, inorganic filler, and organic peroxide to polypropylene. This document discloses a technology for increasing shock resistance through a bridged polypropylene structure obtained by inducing a chemical reaction by adding a bifunctional compound such as diene having two double bonds or a multifunctional unsaturated compound having three reaction points with radicals, together with organic peroxide.

However, a gel content is increased in the bridging reaction and the bridged gel is not melted. For this reason, it is impossible to recycle molded parts and unreacted functional compounds may lower optical stability and thermal stability of a composition and may be discolored during processing or using molded parts. In the technology in which organic peroxide is used, it is very important to adjust a gel content and reduce a volatile organic compound. Hence, productivity and workability may be significantly decreased, and issues relating to harmfulness to humans such as sick house syndrome may occur due to heady odor-causing substances, so that it may be improper for office and residential environment or vehicle interior products. In addition, since a large amount of inorganic filler as inorganic substance is used to a high percentage, the weight of the vehicle is increased to cause a deterioration in fuel efficiency, in which case it may decrease physical properties such as tensile strength, flexural strength, elongation, and flexural modulus of elasticity although it improves shock resistance.

Accordingly, it is necessary to urgently develop a compound composition for a vehicle interior material, which improves fuel efficiency of a vehicle by reducing its weight through low specific gravity while enhancing physical properties, such as shock resistance, tensile strength, flexural strength, elongation, flexural modulus of elasticity, and heat deflection temperature of a vehicle interior material including a vehicle part, achieving eco friendliness, improving workability, easily recycling scrap, and reducing costs of manufacture.

SUMMARY OF THE INVENTION

An object of the present invention is to provide a compound composition for a vehicle interior material using a natural fiber, which is composed of a base resin obtained by mixing a high-fluidity polypropylene resin and a high-impact polypropylene resin, the base resin being a thermoplastic resin, a reinforcing filler that is a lightweight, eco-friendly, and low-density natural fiber, an impact modifier that is ethylene-propylene-octene rubber, an inorganic filler that functions as a nucleating agent, and a maleic-anhydride compatibilizer, thereby resolving a problem relating to a conventional vehicle interior material including a vehicle part. In particular, there is provided a compound composition for a vehicle interior material using a natural fiber, which improves fuel efficiency of a vehicle by reducing its weight by means of a vehicle interior material including a vehicle part through low-density composition while achieving eco friendliness, enhancing physical properties, such as shock resistance, tensile strength, flexural strength, elongation, flexural modulus of elasticity, and heat deflection temperature, improving workability through a reduction in weight, recycling scrap, and reducing costs of manufacture.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an aspect of the present invention, a compound composition for a vehicle interior material using a natural fiber includes a base resin obtained by mixing a high-fluidity polypropylene resin and a high-impact polypropylene resin, the base resin being a thermoplastic resin, a reinforcing filler that is a lightweight, eco-friendly, and low-density natural fiber, an impact modifier that is ethylene-propylene-octene rubber, an inorganic filler that functions as a nucleating agent, and a maleic-anhydride compatibilizer.

It is to be understood that both the foregoing general description and the following detailed description of the present invention are exemplary and explanatory and are intended to provide further explanation of the invention as claimed.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a view for explaining an arrangement state of a plurality of molded natural fibers having different cut lengths according to an embodiment of the present invention.

DESCRIPTION OF SPECIFIC EMBODIMENTS

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various FIGURES and embodiments of the present invention.

Hereinafter, a compound composition for a vehicle interior material using a natural fiber according to an embodiment of the present invention will be described in detail.

In addition, each composition and its weight ratio given through the specification are illustrated by way of example, and the present invention is not limited thereto.

A vehicle interior material made of the compound composition for a vehicle interior material using a natural fiber according to the embodiment of the present invention can improve fuel efficiency of a vehicle through low-density composition, compared to a convention vehicle interior material, while achieving eco friendliness, enhancing physical properties, such as shock resistance, tensile strength, flexural strength, elongation, flexural modulus of elasticity, and heat deflection temperature, improving workability through a reduction in weight, recycling scrap, and reducing costs of manufacture. To this end, "each composition of appropriate composition" and "its weight ratio" are described in detail in the embodiment of the present invention, and it should be understood that numerical limitation given through the specification is merely by way of example and is not intended to limit the present invention.

In addition, the compound composition for a vehicle interior material using a natural fiber according to the embodiment of the present invention can reduce the weight of the vehicle interior material including the vehicle part processed using the composition, and simultaneously have use for enhancing physical properties, such as shock resistance, tensile strength, flexural strength, elongation, flexural modulus of elasticity, and heat deflection temperature.

The compound composition for a vehicle interior material using a natural fiber according to the embodiment of the present invention, is composed of, with respect to the total 100 wt % of the compound composition, 1) 40 to 85 wt % of a base resin obtained by mixing 50 wt % of a high-fluidity polypropylene resin and 50 wt % of a high-impact polypropylene resin, based on 100 wt % of the base resin, wherein the base resin is a thermoplastic resin, 2) 5 to 20 wt % of a natural fiber which is one selected from natural fiber materials, such as wood or lumber, a yam, a cactus fiber, and a coconut, or a combination of one or more of them, wherein the natural fiber is a reinforcing filler, 3) 5 to 15 wt % of an impact modifier that is ethylene-propylene-octene rubber, 4) 0.5 to 10 wt % of a an inorganic filler which is one selected from talc, calcium carbonate, and mica, or a combination of one or more of them, wherein the inorganic filler functions as a nucleating agent, and 5) 4.5 to 15 wt % of a maleic-anhydride compatibilizer.

As occasion demands, the compound composition for a vehicle interior material using a natural fiber according to the embodiment of the present invention may further include, with respect to the total 100 parts by weight of the compound composition, 0.1 to 5.0 parts by weight of a thermal stabilizer for an improvement in thermal stability, 0.1 to 3.0 parts by weight of an antioxidant such as phenol or phosphorus for prevention of oxidation, and 0.1 to 2.0 parts by weight of a pigment for coloring, as additives.

The base resin as a thermoplastic resin is composed of high-fluidity polypropylene consisting of an high crystalline polypropylene (HCPP) block copolymer, which has a specific gravity of 0.91, a melting index of 90 to 110 g/10 min, and an impact strength of 55 to 65 J/m, in order to satisfy high fluidity of resin required in an injection molding process, and 40 to 85 wt %, preferably 60 to 80 wt % of high-impact polypropylene, which has a specific gravity of 0.91, a melting index of 25 to 35 g/10 min, and an impact strength of 70 to 80 J/m, in order to satisfy shock resistance required in a vehicle injection material.

The high-fluidity polypropylene resin and the high-impact polypropylene resin are mixed at a ratio of 50:50 wt % based on 100 wt % of the base resin, and are processed at a temperature of 210 to 230° C.

Accordingly, the base resin is complexly composed of the high-fluidity polypropylene resin and the high-impact polypropylene resin to improve fluidity of resin and workability by the high-fluidity polypropylene resin when the composition of the present invention is processed into a vehicle interior material by injection molding and to enhance shock resistance by the high-impact polypropylene resin.

The natural fiber as a reinforcing filler has a low specific gravity of 0.9 to 1.5 to reduce a weight of the vehicle interior material processed by the composition of the present invention while enhancing physical properties, such as tensile strength, flexural strength, elongation, and flexural modulus of elasticity. The natural fiber is one selected from natural fiber materials, such as wood or lumber, a yam, a cactus fiber, and a coconut, or a combination of one or more of them, and is composed of 5 to 20 wt %, preferably 10 to 15 wt % of natural fibers which have different cut lengths within a range of 50 to 250 μm and have a needle structure. The natural fiber is a natural fiber having a low specific gravity of 0.9 to 1.5.

In addition, the natural fiber has a lightweight structure compared to the inorganic filler having a needle structure and a specific gravity of about 0.9 to 1.5. In the natural fiber, the filler is adjustable in various forms such as spheres, plates, or flakes by a physical or chemical method. The natural fiber has an aspect ratio of about ⅓ compared to a fibrous structure. Therefore, the natural fiber has excellent elongation and flexural modulus of elasticity in virtue of a small directional property and a low aspect ratio, whereas it has a slight reinforcement characteristic in tensile strength and flexural strength.

In order to resolve the above problems in the present invention, the natural fiber is cut into a plurality of natural fibers having different cut lengths (for instance, 50 μm, 75 μm, and 180 μm) within range of 50 to 250 μm to have a needle structure when it is formed into a vehicle interior material, as illustrated in FIG. 1.

Accordingly, when the vehicle interior material is formed using the natural fiber having this composition, it is possible to enhance tensile strength and flexural strength and to acquire a lightweight vehicle interior material compared to the related art.

Through the natural fiber having this composition, it is possible to enhance physical properties such as specific strength and specific elasticity compared to conventional inorganic reinforcement having a specific gravity of 2.5 to 4.0, to improve the interfacial bond strength between hydrophobic polypropylene and hydrophilic natural fiber, to recycle scrap to be harmless to humans with eco friendliness, to improve workability through a reduction in weight, and to reduce costs of manufacture.

The impact modifier is composed of 5 to 15 wt %, preferably 5 to 10 wt % of ethylene-propylene-octene rubber consisting of low-density polyethylene-co-octene, the content of which is 8.0 to 15%, and which is synthesized with a metallocene catalyst having a specific gravity of 0.88.

Accordingly, it is possible to secondarily enhance the shock resistance of the vehicle interior material processed by the composition of the present invention, through the impact modifier.

The inorganic filler for functioning as a nucleating agent is composed of 0.5 to 10 wt %, preferably 0.5 to 5 wt % of an inorganic filler, is one selected from talc, calcium carbonate, and mica, or a combination of one or more of them, functions as a nucleating agent for improving a crystallization rate and a degree of crystallinity of a molded part, and has a specific gravity of 2.5 to 3.2 and a particle size of 5 to 10 μm, in order to improve molding productivity and increase mechanical properties of a molded part within a short time when forming polypropylene as the base resin.

The compatibilizer is used to further increase physical coupling and chemical bonding between the interface of the natural fiber used as the reinforcing filler and the interface of the high-fluidity/high-impact polypropylene used as the base resin, and is composed of 4.5 to 15 wt %, preferably 4.5 to 10 wt % of a maleic-anhydride compatibilizer.

Accordingly, by means of the composition of the compatibilizer, it is possible to further enhance impact strength together with a molecular weight through extension of a chain by introducing acid anhydride (MAH) into a polypropylene chain having high mechanical and thermal properties.

Meanwhile, as occasion demands, the compound composition for a vehicle interior material using a natural fiber according to the embodiment of the present invention may further include, with respect to the total 100 parts by weight of the compound composition, 0.1 to 5.0 parts by weight of a thermal stabilizer for an improvement in thermal stability, 0.1 to 3.0 parts by weight of an antioxidant such as phenol or phosphorus for prevention of oxidation, and 0.1 to 2.0 parts by weight of a pigment for coloring, as additives.

In addition, the thermoplastic resin may be replaced with an ABS resin or a PET resin, if necessary.

In addition, the thermoplastic resin obtained by mixing the high-fluidity polypropylene resin and the high-impact polypropylene resin may be one selected from high-fluidity polypropylene and high-impact polypropylene resins, if necessary.

In addition, the natural fiber as the reinforcing filler may be replaced with a natural fiber processed using chemical material, if necessary.

As described above, the compound composition for a vehicle interior material using a natural fiber according to the embodiment of the present invention can resolve problems relating to low fuel efficiency due to a high percentage according to using high-density inorganic fillers as a large amount of inorganic substances in the conventional vehicle interior material including the vehicle part and thus the heavy weight of the vehicle, and relating to generation of pollution substances harmful to humans, can enhance the physical properties, such as shock resistance, tensile strength, flexural strength, elongation, flexural modulus of elasticity, and heat deflection temperature of the vehicle interior material including the vehicle part, can improve workability through a reduction in weight, and can recycle scrap and reduce costs of manufacture.

Hereinafter, the present invention will be described in more detail with reference to examples.

It should be understood that the following examples are merely by way of example for explaining the preferable embodiment of the present invention and the present invention is not limited thereto.

Of course, the natural fiber as the reinforcing filler in the present invention may be replaced with a natural fiber processed using chemical material, and it may also be applied to extrusion molded parts such as vehicle extrusion seats, instead of injection molded parts. Although the present invention is described to be the compound composition for a vehicle interior material for convenience, it is of course applicable to all vehicle materials including a vehicle exterior material.

Example 1 illustrates a door trim which is formed using a compound composition of the present invention at a heating temperature of 220° C. in an injection molding machine and has having a thickness of 2.5 mm, wherein the compound composition of the present invention includes, with respect to the total 100 wt % of the compound composition, 65 wt % of a base resin obtained by mixing 50 wt % of a high-fluidity polypropylene resin and 50 wt % of a high-impact polypropylene resin, based on 100 wt % of the base resin, the base resin being a thermoplastic resin, 15 wt % of a natural fiber obtained by cutting wood to have different cut lengths of 50 μm, 75 μm, and 180 μm, the natural fiber having a specific gravity of 0.91 and being a reinforcing filler, 10 wt % of an impact modifier that is ethylene-propylene-octene rubber, 5 wt % of talc, the talc being an inorganic filler functioning as a nucleating agent, and 5 wt % of a maleic-anhydride compatibilizer, and includes, with respect to the total 100 parts by weight of the compound composition, 0.8 parts by weight of an antioxidant such as phenol or phosphorus for prevention of oxidation, 0.5 parts by weight of calcium stearate that is a thermal stabilizer, and 0.2 parts by weight of carbon black that is a pigment, as additives.

Example 2 illustrates a door trim which is formed using a compound composition of the present invention at a heating temperature of 220° C. in an injection molding machine and has having a thickness of 2.5 mm, wherein the compound composition of the present invention includes, with respect to the total 100 wt % of the compound composition, 70 wt % of a base resin obtained by mixing 50 wt % of a high-fluidity polypropylene resin and 50 wt % of a high-impact polypropylene resin, based on 100 wt % of the base resin, the base resin being a thermoplastic resin, 10 wt % of a natural fiber obtained by cutting wood to have different cut lengths of 50 μm, 75 μm, and 180 μm, the natural fiber having a specific gravity of 0.91 and being a reinforcing filler, 10 wt % of an impact modifier that is ethylene-propylene-octene rubber, 5 wt % of talc, the talc being an inorganic filler functioning as a nucleating agent, and 5 wt % of a maleic-anhydride compatibilizer, and includes, with respect to the total 100 parts by weight of the compound composition, 0.8 parts by weight of an antioxidant such as phenol or phosphorus for prevention of oxidation, 0.5 parts by weight of calcium stearate that is a thermal stabilizer, and 0.2 parts by weight of carbon black that is a pigment, as additives.

Comparative Example illustrates a door trim which is formed using a compound composition at the same heating temperature of 220° C. as Examples 1 and 2 in an injection molding machine and has having a thickness of 2.5 mm, wherein the compound composition includes, with respect to the total 100 wt % of the compound composition, 80 wt % of polypropylene that is a thermoplastic resin, and 20 wt % of a glass fiber that is an inorganic filler having a specific gravity of 2.6, and includes, with respect to the total 100 parts by weight of the compound composition, 0.8 parts by weight of an antioxidant such as phenol or phosphorus for prevention of oxidation, 0.5 parts by weight of calcium stearate that is a thermal stabilizer, and 0.2 parts by weight of carbon black that is a pigment, as additives.

For the above Examples 1 and 2 and Comparative Example, the following Table 1 illustrates test criterion values for main physical properties ("Test Criteria for Vehicle Material in Hyundai Motor Company") and the following Table 2 illustrates result values for main physical properties.

Test Method

The result of physical properties indicated in the following tables refers to mean values of physical properties of five specimens, except for upper and lower limits, and the test method thereof is as follows.

A. Measurement of Melting Index (MI)

The amount obtained by measuring the melting index at a temperature of 230° C. and a load of 2.16 kg for 10 minutes according to ASTM D1238 is indicated as g/10 min. An MI tester (made by Toyo Seki Company) is used for measurement.

B. Measurement of Specific Gravity

After a tension specimen is cut according to ASTM D638 to manufacture a test specimen for measurement a specific gravity, it is measured by ASTM D792. A Specific Gravity Balance (made by Mirage Company, Measuring Range: 200 g/0.001 g) is used for measurement.

C. Measurement of Tensile Strength & Elongation

The tensile strength and elongation are measured according to ASTM D638. In this case, the test speed is 50 mm/min and a UTM (made by Comtech Company) is used for measurement.

D. Measurement of Flexural Strength & Flexural Modulus of Elasticity

The flexural strength and flexural modulus of elasticity are measured according to ASTM D790. In this case, the test speed is 30 mm/min and a UTM (made by Comtech Company) is used for measurement.

E. Measurement of Impact Strength

The impact strength is measured at a room temperature of 23° C. according to ASTM D256. An IZOD impact tester (made by YASUDA Company) is used for measurement.

F. Measurement of Heat Deflection Temperature & Hardness

The heat deflection temperature and hardness are measured using a hardness meter.

G. Whether it is eco friendly

The materials of compositions in Examples 1 and 2 and Comparative Example are evaluated relative to each other.

TABLE 1

| Item | Required Physical Property | Unit |
| --- | --- | --- |
| Melting Index (MI) | 20 or more | g/10 min |
| Specific Gravity | 0.93 ± 0.02 | — |
| Tensile Strength | 20 or more | MPa |
| Elongation | 30 or more | % |
| Flexural Strength | 33 or more | MPa |
| Flexural Modulus of Elasticity | 1,700 or more | MPa |
| Impact Strength (Izod) | 200 or more | J/m |
| Heat Deflection Temperature | 125 or more | |
| Rockwell Hardness | 67 or more | — |

TABLE 2

| | Example | | Comparative |
| --- | --- | --- | --- |
| Sort | Example 1 | Example 2 | Example |
| Melting Index (MI) | 22 | 22 | 24 |
| Specific Gravity | 0.92 | 0.92 | 1.21/Fail |
| Tensile Strength | 24 | 23 | 23 |
| Elongation | 35 | 34 | 28/Fail |
| Flexural Strength | 38 | 37 | 30/Fail |
| Flexural Modulus of Elasticity | 1,790 | 1,750 | 950/Fail |
| Impact Strength (Izod) | 255 | 249 | 140/Fail |
| Heat Deflection Temperature | 132 | 133 | 123/Fail |
| Rockwell Hardness | 70 | 69 | 73 |

As indicated in the above Table, it can be seen that the door trim processed using the composition of the present invention according to Examples 1 and 2 has excellent physical properties in terms of all melting index, specific gravity, tensile strength, elongation, flexural strength, flexural modulus of elasticity, impact strength, heat deflection temperature, and hardness on the basis of the same thickness, compared to that in Comparative Example, since all items of physical properties in the present invention satisfy the test criteria for vehicle material.

Particularly, the door trim, which is a molded part formed of the low-density natural fiber as the reinforcing filler of the present invention, has a low specific gravity of 0.92, compared to the door trim of Comparative Example having a specific gravity of 1.21. Therefore, it can be seen that, since the weight of the vehicle interior material including the vehicle part is reduced by 31.5%, the fuel efficiency of the vehicle is significantly improved.

In addition, it can be seen that the composition of the present invention is eco friendly and harmless to humans since it uses the natural fiber, and achieves an improvement in workability and a reduction in cost by easily recycling scrap.

In the door trim processed using the composition of Comparative Example, the melting index, tensile strength, and hardness satisfy the test criteria for vehicle material, but the specific gravity, elongation, flexural strength, flexural modulus of elasticity, impact strength, and heat deflection temperature do not satisfy and fail to pass the test criteria for vehicle material. Hence, the door trim processed using the composition of Comparative Example has a problem.

In addition, since the door trim, which is a molded part formed of a glass fiber as a high-density inorganic filler, has a high specific gravity of 1.12 and is heavy in weight, there are problems in that it deteriorates the fuel efficiency of the vehicle, is harmful to humans, and causes environment pollution, and it is difficult to recycle scrap. In addition, there are problems relating to low workability and an increase in cost.

As is apparent from the above description, in accordance with a compound composition for a vehicle interior material using a natural fiber according to exemplary embodiments of the present invention, it is possible to resolve a problem relating to a conventional vehicle interior material including a vehicle part, and particularly to realize an improvement in fuel efficiency of a vehicle and achieve eco friendliness since a vehicle interior material including a vehicle part has a low specific gravity compared to the conventional vehicle interior/exterior material including the vehicle part.

In addition, it is possible to enhance physical properties, such as shock resistance, tensile strength, flexural strength, elongation, flexural modulus of elasticity, and heat deflection temperature of the vehicle interior material including the vehicle part.

In addition, it is possible to improve workability through a reduction in weight.

Furthermore, it is possible to recycle scrap and reduce costs of manufacture.

While the present invention has been described with respect to the specific embodiments, it will be apparent to those skilled in the art that various changes and modifications may be made without departing from the spirit and scope of the invention as defined in the following claims.

What is claimed is:

1. A compound composition for a vehicle interior material using a natural fiber, the compound composition comprising:
    with respect to the total 100 wt % of the compound composition,
    40 to 85 wt % of a base resin obtained by mixing 50 wt % of a high-fluidity polypropylene resin and 50 wt % of a high-impact polypropylene resin, based on 100 wt % of the base resin, the base resin being a thermoplastic resin;
    5 to 20 wt % of a natural fiber comprising natural fiber materials selected from wood or lumber, a yam, a cactus fiber, and a coconut, or a combination of one or more of them, the natural fiber being a reinforcing filler;
    5 to 15 wt % of an impact modifier that is ethylene-propylene-octene rubber;
    0.5 to 10 wt % of an inorganic filler, which is one selected from talc, calcium carbonate, and mica, or a combination of one or more of them; and
    4.5 to 15 wt % of a maleic-anhydride compatibilizer.

2. The compound composition according to claim 1, further comprising:
    with respect to the total 100 parts by weight of the compound composition, as additives,
    0.1 to 5.0 parts by weight of a thermal stabilizer for an improvement in thermal stability;
    0.1 to 3.0 parts by weight of an antioxidant, which is one selected from phenol or phosphorus, for prevention of oxidation; and
    0.1 to 2.0 parts by weight of a pigment for coloring.

3. The compound composition according to claim 1, wherein the thermoplastic resin is composed of:
    high-fluidity polypropylene consisting of a high crystalline polypropylene (HCPP) block copolymer that has a specific gravity of 0.91, a melting index of 90 to 110 g/10 min, and an impact strength of 55 to 65 J/m; and
    high-impact polypropylene that has a specific gravity of 0.91, a melting index of 25 to 35 g/10 min, and an impact strength of 70 to 80 J/m.

4. The compound composition according to claim 1, wherein the reinforcing filler is composed of natural fibers having different cut lengths within a range of 50 to 250 μm and having a needle structure.

5. The compound composition according to claim 1, wherein the inorganic filler is composed of talc, calcium carbonate, or mica, which has a specific gravity of 2.5 to 3.2 and a particle size of 5 to 10 μm.

* * * * *